2,750,302

METHOD OF PREPARING A NON-BLOOMING ASBESTOS CEMENT SHINGLE AND PRODUCT THEREOF

Frank V. Camarda, Bound Brook, Frank J. Gumbs, Butler, and Robert B. Lovell, Parsippany, N. J., assignors to The Patent Licensing Corporation, New York, N. Y., a corporation of Massachusetts No Drawing. Application May 6, 1955, Serial No. 506,662

6 Claims. (Cl. 117—72)

This invention relates to improved asbestos-cement products and more particularly to asbestos-cement shingles having a resinous coating on the exterior face thereof, primarily to inhibit blooming.

Colored asbestos-cement siding, building board and roofing shingles as heretofore produced, have a tendency to develop an objectionable white haze or discoloration, which is referred to in the asbestos-cement products' art as "bloom" or "efflorescence" and is hereinafter referred to as "blooming." Such white haze or discoloration is believed to be due to the migration of free calcium oxide, present in small amount in the hydraulic cement in the form of calcium hydroxide, to the surface of the products. Carbon dioxide in the atmosphere reacts with the calcium hydroxide to convert it to calcium carbonate. The calcium carbonate thus produced is of a white or grayish hue and thus contrasts in color with that of the products, producing the above-noted objectionable white haze or discoloration.

In general, during the first six to eight months that the asbestos-cement products are exposed to the atmosphere, blooming takes place due to the leaching out by water, such as rain water, of the small amount of free calcium oxide present in the cement. At the end of six to eight months, the objectionable free calcium oxide will have been converted to calcium carbonate, and thus there will be no tendency for further blooming to take place. In the meantime, however, the calcium carbonate formed imparts an objectionable appearance to the products. Furthermore, blooming takes place during the hydration of the Portland cement and particularly when a steam curing process is employed. This may be attributable to water in the liquid phase leaching out the free calcium oxide and bringing it to the surface with consequent formation of calcium carbonate.

It has been customary in the prior art to coat asbestos-cement shingles and the like, with wax which in some cases reduces the bloom and aids in making the shingle water resistant. Its bloom-inhibiting power is, however, somewhat erratic and it is subject to scuffing or spotty polishing which adversely affects the appearance.

It is an object of the present invention to provide an improved asbestos-cement product which is bloom-proof.

It is a further object of the present invention to provide an improved asbestos-cement product which combines the qualities of being bloom-proof, scuff resistant and is of improved appearance.

It is a further object of the present invention to provide an improved asbestos-cement product having a water resistant exposed surface.

It is a further object of the present invention to provide an improved asbestos-cement product having a water resistant exposed surface, which exposed surface does not yellow or cause sticking in bundles.

This and other objects are attained by the present invention which relates to an asbestos-cement product having on the surface thereof a thin film of a composition comprising polyethylene resin, sodium silicate and acrylic resin. The product is preferably an asbestos-cement roofing or siding shingle. The film is preferably colorless and of a thickness from 0.1 to 2.0 mils and preferably about 0.4 mils in thickness.

While it will be understood that variations and substitutions may be made within the scope of the claims, the following is an example illustrating the preferred form of the invention:

| | Parts by weight |
|---|---|
| Polyethylene resin | 4.24 |
| Oleic acid | 0.85 |
| Morpholine | 0.85 |
| Sodium silicate, solids (N brand) | 1.90 |
| Acrylic resin, solids (Rhoplex X-52) | 3.13 |
| Water | 82.07 |

The polyethylene resin used was a partly oxidized form of low molecular weight polyethylene having a molecular weight of about 2,000. It was an off-white solid having a viscosity of 40 to 50 by the Saybold-Furol method at 140° C. The particular resin used was Polyethylene 629 obtained from Allied Chemical Company. The solid polyethylene was combined with oleic acid and melted. After melting the morpholine was added. The water was heated separately to about boiling temperature and then the molten material and the hot water added to a Charlotte mill. The water is used in a proportion of about three parts per part of the polyethylene in making this base emulsion.

The acrylic resin used was obtained commercially in emulsion form with a solids content of about 45% and a pH of 4 to 5. It is known as Rhoplex X-52 and was obtained from the Rohm and Haas Company. The sodium silicate is obtained in solution form containing about 37% solids. The final formulation was prepared by a simple mixing with an agitator of the water to which was added the sodium silicate, then the polyethylene emulsion and finally, the acrylic resin emulsion.

The shingle prior to the application of the above formulation was treated with an in-process wax treatment. This involves the application of a wax emulsion to the asbestos-cement shingle while it is still wet and then drying and curing the shingle. The in-process treatment preferably involves spraying with an emulsion of microcrystalline wax or Carnauba wax or blends of Carnauba wax with paraffin wax. The preferred wax is a Carnauba wax having a melting point of at least 130° F., and the emulsion should have a solids content of 0.5 to 5%, and preferably 1 to 3%. In the case of asbestos-cement products produced by the Hatschek method and containing 25 to 30% water, from 2 to about 15 grams and preferably 8 to 10 grams of wax emulsion are applied per square foot of shingle. In the treatment of shingles produced by the Norton process, in which the water content of the product may be 20% or less, as much as 40 grams of emulsion may be applied per square foot of shingle surface.

The above formulation was applied to a green siding shingle of asbestos-cement having the above in-process wax treatment. The shingle was preheated to have a surface temperature of 125° to 145° F. The emulsion formulation was maintained in the temperature range of 100° to 125° F. The shingle was sprayed with the emulsion and the veneered face and edges coated. Excess emulsion was blown off with air under pressure. Mild heat applied to the face aided drying of the resin film. After drying it was packaged.

The shingle had an attractive lustrous wet appearance and was not tacky on the surface, and when stacked under a heavy load of other shingles the film did not show a sticking tendency. In handling in contact with other shingles, no scuffing appeared on the surface thereof. Exposure on a side wall showed no bloom. In three hundred hours weatherometer exposure to ultraviolet rays it did not yellow.

Besides inspection for appearance, the shingle was subjected to the following tests:

*Ink stain test.*—Approximately 2 cc. of full strength red ink was applied to the shingle. The shingle was tilted to allow the ink to roll across the shingle. After ten seconds of ink contact time, the shingle was thoroughly flooded with tap water. The remaining stain after this treatment was only slight by visual inspection.

*Water repellency test.*—Tap water dropped onto the shingle showed only a slight trace of wetting after ten seconds' contact, the droplets of water rolling off readily. The thickness of the film on the shingle was 0.4 mil.

The excellent results obtained with such a very thin film of the resin are indeed unexpected. It was unexpected that such a thin film would give these results, and that painting of an asbestos-cement product with a heavier pigmented film does not yield all of these desirable results. Heavier applications of the resin tend to cause sticking and introduce cracking and yellowing as well as a noticeably bad appearance as the paint wears off. The very thin film unexpectedly gives water resistance, bloom prevention and also an attractive lustrous, non-yellowing, wet appearance which improves any of the asbestos-cement products, but particularly black roofing shingles. After many months in the weather the resin wears off, but by then the likelihood of bloom has passed and the wearing off of such a thin film of the resin is hardly noticeable.

The clear transparent resin produces a glossy surface on the shingle which gives more depth to texture. The coating is substantially mar-proof. It is water repellent as indicated by the ink stain test and stains and dirt marks may be washed off with soap and water. In the case of shingles having a surface decoration of small granules, the coating aids in binding the granules to the surface of the shingle.

While the present invention is preferably applicable to dark colored shingles, especially black shingles, it is also applicable to other types of shingles and other colors including white. While a thickness of 0.4 mil of resin has been used in the above examples, amounts generally in the range 0.1 to 2.0 mils may be used, and preferably in the range of 0.2 to 0.8 mil. While spraying has been illustrated as the process for applying the emulsion, it may be applied by dipping the shingle or flooding the surface thereof. While solvent solutions of resin may be used, it had been found more desirable to apply the resin by means of a dilute water emulsion thus eliminating solvent removal and recovery.

The acrylic resin and the polyethylene resin may be in grades of the materials which are solid at ordinary temperatures. The sodium silicate may be of any commercially available grade. The proportions of the three principal ingredients, polyethylene, acrylic and silicate, may vary substantially within the range 2 to 6 parts of polyethylene, 1 to 4 parts of silicate and 2 to 4 parts of acrylic, and preferably they are in the proportions of about 4 parts polyethylene, 2 parts silicate and 3 parts acrylic, all on a solids basis.

While we have emphasized bloom resistance, the present invention gives other desirable and unexpected results. Some shingles coated with resins blush, while ours do not. Blushing may be described as a spotty wet and dry appearance, which may occur after the first rainfall. It does not involve exuding salts as in bloom. Our shingles can also be painted, if desired, while some others cannot.

While we have utilized sodium silicate in our formulation, it will be understood that other soluble silicates may be used.

We claim:

1. A non-blooming asbestos-cement product having on the surface thereof a thin film of a composition comprising from 2 to 6 parts by weight of polyethylene resin, from 1 to 3 parts of sodium silicate and from 2 to 4 parts of acrylic resin.

2. A non-blooming asbestos-cement shingle having on the exterior surface thereof a composition comprising 2 to 6 parts of polyethylene resin, 1 to 3 parts of sodium silicate and 2 to 4 parts of acrylic resin in the form of a colorless film having a thickness in the range 0.1 to 2.0 mils.

3. A non-blooming asbestos-cement shingle having on the surface thereof a pervious film of wax and a second film overlying said wax film comprising from 2 to 6 parts of polyethylene resin, 1 to 3 parts of sodium silicate and 2 to 4 parts of acrylic resin.

4. A non-blooming asbestos-cement shingle having on the exterior surface thereof a pervious film of wax and a second film overlying said wax film comprising from 2 to 6 parts of polyethylene resin, 1 to 3 parts of sodium silicate and 2 to 4 parts of acrylic resin, said second film having a thickness in the range 0.2 to 0.8 mil.

5. A non-blooming asbestos-cement product having on the surface thereof a pervious film of wax and a second colorless film overlying said wax film comprising about 4 parts by weight of polyethylene, about 2 parts by weight of sodium silicate and about 3 parts by weight of acrylic resin, said second film having a thickness of about 0.4 mil.

6. A process for preparing a non-blooming asbestos-cement shingle comprising applying a thin film of wax emulsion prior to the curing of the shingle and after curing the shingle preheating the shingle to a temperature of 125° to 145° F. and applying thereto an emulsion containing about 4 parts of polyethylene resin, about 2 parts of sodium silicate and about 3 parts of acrylic resin and drying the shingle.

References Cited in the file of this patent

UNITED STATES PATENTS

| | | |
|---|---|---|
| 2,019,852 | Harrap | Nov. 5, 1935 |
| 2,588,828 | Greiner | Nov. 11, 1952 |
| 2,716,619 | Jubbins et al. | Aug. 30, 1955 |